United States Patent Office 3,095,321
Patented June 25, 1963

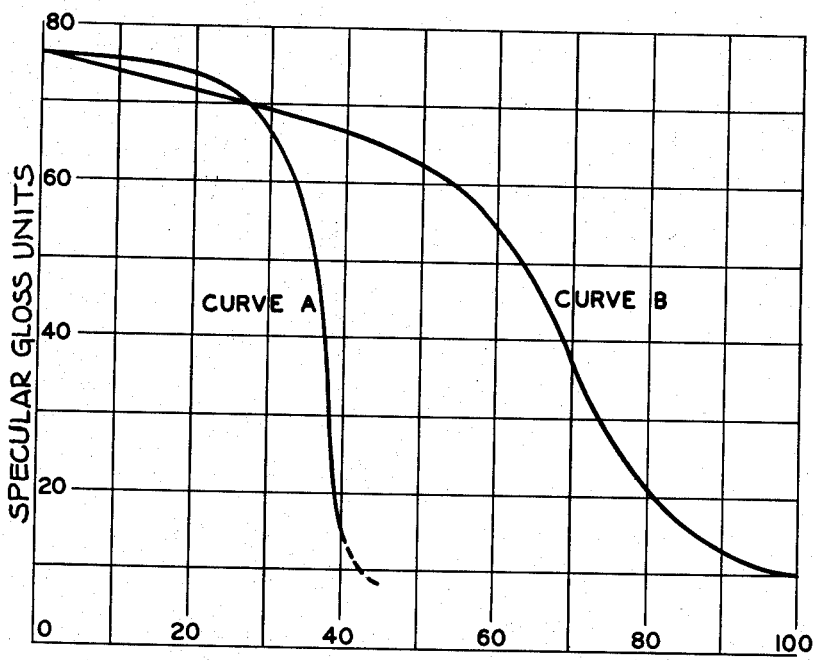
FIG. I  WEIGHT OF ADDITIVE
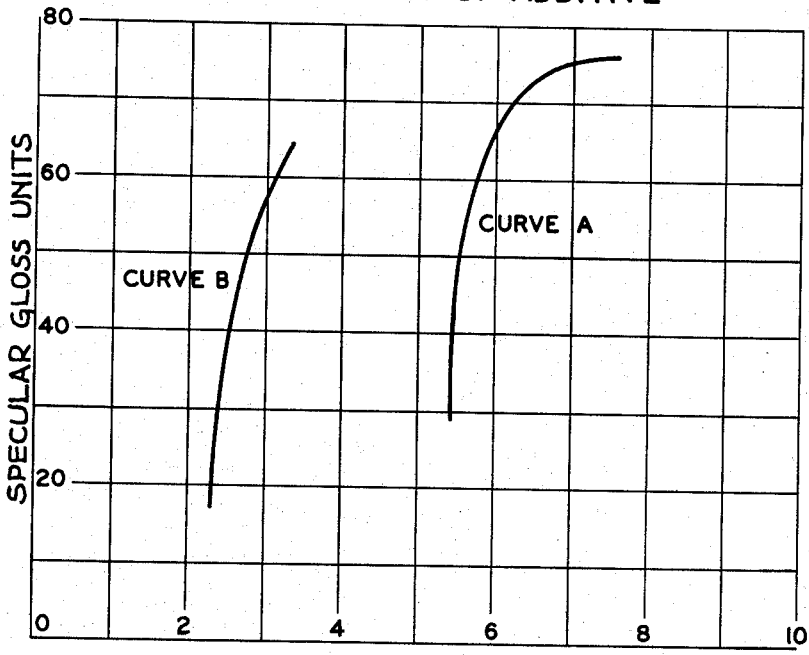
FIG. 2  SUBSURFACE ABRASIVE INDEX

3,095,321
HIGH HARDNESS PORCELAIN ENAMEL COMPOSITION, METHOD OF COATING THEREWITH AND ARTICLE PRODUCED THEREBY
James G. Breedlove, Signal Mountain, Tenn., assignor to American Lava Corporation, Chattanooga, Tenn., a corporation of Tennessee
Filed June 5, 1961, Ser. No. 114,990
13 Claims. (Cl. 117—129)

This invention relates to high hardness porcelain enamels, and to compositions and methods for preparing high hardness porcelain enamel coatings particularly for aluminum and aluminum base alloys.

For the past forty years or so, much work has been done in the field of porcelain enamels for aluminum. Many different formulations have been developed during this time, but insofar as is known, formulas exhibiting high hardness and resistance to abrasion have not been readily gained in combination with other desired properties by prior art practices. This is particularly true in the case of achieving hardness plus gloss in enamel finishes for aluminum. It may be that hardness and abrasion resistance have been willingly sacrificed in the belief that such properties necessarily upset the balance of basic properties required in enamels for aluminum base materials. Basically, enamel coatings for aluminum must mature at temperatures below about 600° C. inasmuch as aluminum loses its structural strength at temperatures much above 600° C. They also must exhibit a thermal expansion coefficient of at least about $12 \times 10^{-6}$ per ° C. between 50 and 350° C. (except where the enamel is to be used on aluminum clad steel, in which case the coefficient may be somewhat lower, say about $10 \times 10^{-6}$ per ° C. between 50 and 350° C.); and their thermal expansion coefficient may range up to about 20 or even $23 \times 10^{-6}$ per ° C. between 50 and 350° C.

This invention presents the art with porcelain enameling compositions which exhibit not only the necessary balance of properties for use on aluminum, but also which mature into enamel coatings exhibiting improved hardness and abrasion resistance in combination with good gloss characteristics.

A critical requirement in accomplishing the formation of high hardness and good gloss enamel coatings according to the instant invention is that of adding a special refractory material to glassy base frit material after the frit is formed instead of blending the same with raw batch ingredients formed into the glassy frit. This is critical inasmuch as, while a portion of the primary refractory additive of the invention may be compounded into a glassy frit, the advantageous results gained by practice of the invention are greatly diminished when the refractory additive is solely mixed with the raw batch formed into the glassy base frit.

By far the most outstanding results of the invention are gained when magnesium aluminate is chosen as the primary refractory additive for mixing with previously-formed porcelain or glassy frit material. Surprisingly, relatively great amounts (e.g., 60 parts by weight, or even somewhat more, per 100 parts of base frit material) of magnesium aluminate may be added to a base glassy frit material without greatly detracting from the gloss of the ultimate porcelain enamel coating formed. As little as 35 parts by weight of pigment grade rutile provide gloss results comparable to those obtained by adding 60 parts of magnesium aluminate to 100 parts of a base frit, but the hardness of the porcelain enamel formed using pigment grade rutile is vastly below that gained using magnesium aluminate as a refractory mill additive. Of course, where improved hardness is paramount and gloss may be sacrificed, additions of 100 parts or even more of magnesium aluminate to 100 parts of base frit may be used according to the teachings herein.

A significant benefit of this invention is that heretofore known porcelain enamel slip compositions suitable for application to aluminum, which characterically are capable of maturation into a porcelain enamel coating at temperatures below approximately 600° C. or so, may be converted by the practice of this invention into porcelain slips which mature to form high hardness glossy coatings; and this is accomplished without greatly upsetting or changing the temperatures of maturation of the slip composition and without significantly changing the thermal coefficient of expansion of the resultant porcelain enamel coating. Further, chemical durability of the resultant enamel remains essentially unaffected by the practice of the invention. Coloring or pigment ingredients may be added as heretofore employed in the art, although slight adjustments in quantity may be desirable in order to match the colors formed using enameling slips not containing the magnesium aluminate additive of the invention.

High hardness enamels of the instant invention are especially useful in the thread guide field. By using thread guides surfaced with my high hardness enamels, greatly improved wear life for the thread guide is realized. As compared to chrome-plated thread guides heretofore rather widely used, thread guides surface coated with the high hardness enamel hereof have been found to exhibit at least five times the wear life of chrome-plated guides, and up to about ten or even fifteen times the wear life thereof. Also, as compared to thread guides porcelain enameled with a heretofore-known porcelain enamel for aluminum, thread guides surface-coated with the high hardness enamel hereof have been found to exhibit no sign of wear after approximately six months usage, whereas otherwise identical thread guides (except for the high hardness mill additive component hereof) have been found to wear out in approximately four months of comparable usage. Thus the invention greatly reduces thread guide replacement costs and other incidental costs of textile manufacturers.

The high hardness enamel coatings of the instant invention permit accurate control of surface finish for thread guides, allowing the formation of smooth or slightly roughened surfaces as desired for particular conditions of use in the industry, thereby permitting a route to improved yarn quality.

A major disadvantage of heretofore-known porcelain enameled aluminum or aluminum alloy cooking utensils has been the lack of abrasion resistance exhibited by the porcelain enamel. By the practice of the instant invention, porcelain enamel frits especially designed for use on aluminum cooking utensils may be upgraded in their abrasion-resistance and hardness to the point where they no longer are unsatisfactory because of poor abrasion resistance or hardness. Glossy hard finishes for enameled cooking utensils, as is possible by practice of the invention, are particularly important inasmuch as the cleanability of the utensil to a great extent depends upon the gloss and hardness of the porcelain enamel finish.

The impact resistance of porcelain enamel coatings hereof has been found to be greater than the impact resistance of otherwise identical porcelain enamel coatings lacking the primary refractory mill addition ingredient. This is true even though in some instances it has been found that a slight lowering of the thermal expansion coefficient of an enamel coating formed according to the invention is accomplished as compared to the enamel coating formed without the primary refractory mill additive of the invention. Even though the change in thermal expansion coefficient is not particularly significant, it would be unexpected to find improved impact resistance exhibited by the coating having the slightly lower thermal expansion coefficient.

The invention will be described by reference to a drawing made a part hereof wherein:

FIGURE 1 is a graph illustrating the higher specular gloss obtained using high additions of magnesium aluminate to 100 parts of base frit (curve B) as compared to that specular gloss obtained using lower additions of titania to the same base frit (curve A); and FIGURE 2 is a graph illustrating the greater hardness in combination with higher gloss exhibited by porcelain enamel coatings of the invention (curve B) as compared with those of the prior art (curve A).

The principles of the invention and the results obtained will be illustrated by making a comparison between a coating formed according to the invention (Example 1) and one formed according to the prior art without the primary refractory mill additive hereof (Counter-Example 1A).

Example 1

A glassy frit material suitable for use on aluminum base material having the following oxide analysis in mol percent was selected: 7.7% $Li_2O$, 17.1% $Na_2O$, 9.5% $K_2O$, 0.6% $SrO$, 3.1% $CdO$, 1.9% $ZnO$, 4.7% $B_2O_3$, 0.6% $Sb_2O_3$, 1.1% $P_2O_5$, 38.1% $SiO_2$, and 15.6% $TiO_2$. Glassy frits of this type are well known and are formed according to well-known procedures, such as, for example, mixing powdered raw material oxides satisfactory to give the desired analysis on melting, and then melting the mixture at temperatures in the range of about 1000°–1200° C. to gain a homogeneous fluid melt, followed by quenching the melt in water. Quenching serves to shatter the glassy melt into small frit particles.

To 100 parts by weight of this frit material were added 11.5 parts of rutile, 22 parts of magnesium aluminate spinel, 50 parts water, and 14 parts of a suspending or mill addition agent consisting of 8 parts by weight of sodium silicate liquid (8.9% $Na_2O$, 28.7% $SiO_2$, and 62.4% water), 4.4 parts by weight of hydrated potassium tetraborate, and 1.6 parts by weight of potassium hydroxide. But for the addition of the magnesium aluminate spinel, the ingredients of this mixture are all conventional ingredients employed in the formation of slip compositions for use in porcelain enameling. For example, it is conventional practice to mix glassy frit material with water and suitable suspending or binding agents together with various coloring agents or opacifying oxides (e.g., $SnO_2$, $TiO_2$, etc.) with the coloring agents or opacifying oxides added up to about 15% by weight of the mill or slip formula.

Next the slip formula was ground until the residue, after screening on a 325 mesh screen, was less than about one gram per 50 cc. of slip. It was sprayed upon a clean aluminum panel at a coating weight sufficient to give a final coating weight of about 0.2 gram per square inch. (Aluminum panels are suitably cleaned by degreasing with a perchloroethylene solvent, followed by dipping in a hot water solution of any suitable commercial detergent, rinsing with clear water and drying.) The coating was dried for about 5 to 10 minutes at room temperature (until the sheen of surface moisture disappeared from the coating), and then fired at about 540° C. for 10 minutes. This resulted in the formation of a porcelain enamel coating essentially free of surface defects, possessing high adherence to the underlying panel, and having other properties to be discussed.

Counter-Example 1A

The procedure and materials of Example 1, except for the omission of magnesium aluminate spinel and increase of the titania additive to the slip to a total of 14 parts by weight, were used in the formation of a further porcelain enameled panel. The enameled coating of this panel, lacking the spinel addition, is widely recognized as a standard gloss white porcelain enamel coating for aluminum base materials.

Comparison of the enameled coating of this invention (Example 1) with the prior art standard gloss white coating (Counter-Example 1A) lacking the magnesium aluminate spinel additive hereof showed the following:

Each panel exhibited a specular gloss of about 70 units.

Under identical Taber abrasion tests, wherein a vitrified grinding wheel under a load of 1,000 milligrams against the enamel coating was rotated for 1,000 cycles, the enamel coating of Example 1 showed a weight loss of only 0.5 milligram, whereas the enamel coating of Counter-Example 1A showed a weight loss of 8.8 milligrams. This Taber abrasion test is widely recognized as a test giving an indication of the abrasion resistance of a coating. A weight loss of only 0.5 milligram indicates extremely high abrasion resistance. The weight loss for the enameled coating of Example 1 was almost imperceptible.

The surface abrasion index of the coating of Example 1 was about 51%, whereas the surface abrasion index of the coating of Counter-Example 1A was about 38%. Surface abrasion index, as used throughout this specification, refers to the percent retention of original gloss exhibited by a porcelain enamel coating after it has been abraded by silica sand according to the test procedure as set forth in Bulletin T–2 of the Porcelain Enamel Institute.

Sub-surface abrasion index throughout this specification refers to the measure of the rate of weight loss (expressed in milligrams per minute) when an enamel coating is abraded by aluminum oxide grain according to the procedure outlined in Bulletin T–2 of the Porcelain Enamel Institute. The sub-surface abrasion index for the coating of Example 1 was 5.2 as compared to the higher value of 7.5 for the coating of Counter-Example 1A.

The coefficient of thermal expansion of the coating of Example 1 and the coating of Counter-Example 1A were essentially the same, with the coating of Example 1 being about 5% lower than that for the coating of Counter-Example 1A.

In acid resistance tests, the coating of Example 1 and the coating of Counter-Example 1A were also essentially the same, with a slight improvement being apparent when testing the coating of Example 1.

The striking improvement in hardness with comparative retention of gloss characterized by the porcelain enamel coatings hereof is graphically illustrated in the drawing. Specifically, curve B of FIGURE 1 of the drawing is a plot of the specular gloss (ordinate of graph) for enamel coatings formed with varying additions (abscissa of graph) of magnesium aluminate spinel to 100 parts of a base frit identified in Example 1, whereas curve A is a plot of the specular gloss for enamel coatings formed with varying additions of rutile to 100 parts of the base frit identified in Example 1. It is particularly noteworthy that much higher additions of magnesium aluminate are possible before loss of gloss in the enamel becomes notable. In FIGURE 2, curves for the sub-surface abrasive index for the coatings used to plot the curves of FIGURE 1 are set forth. From the curves of FIGURE 2 it will be seen that magnesium aluminate greatly contributes to the hardness and wear resistance of the coating.

Example 2

The procedure and materials of Example 1 were duplicated, except that the titania additive was omitted and the magnesium aluminate increased to 45 parts by weight. The resulting porcelain enamel coating showed a specular gloss of 64 units, a surface abrasion index of 51.2% and a sub-surface abrasion index of 3.35 milligrams per minute.

Example 3

Example 2 was duplicated except that the magnesium aluminate was increased to 63.5 parts by weight. The resulting porcelain enamel coating showed a specular gloss of 53 units, a surface abrasion index of 58% and a sub-surface abrasion index of 2.8 milligrams per minute.

Enamel coatings of even greater hardness have been formed using additions of magnesium aluminate as high as 84.5% and even 100 parts by weight; however, after about 100 parts by weight, the improvement in hardness tends to drop off to some extent and, of course, the gloss of the enamel coating is considerably reduced. These coatings may be useful, however, where a mat finish of extreme hardness is desired.

Example 4

A commercially-available lead-bearing frit was selected in forming a porcelain enamel coating according to the practice of this invention. The mol percent oxide analysis of the frit was as follows: 13.3% PbO, 2% $Li_2O$, 27.4% $Na_2O$, 2% $K_2O$, 0.5% $B_2O_3$, 0.4% $Sb_2O_3$, 37.6% $SiO_2$, and 16.8% $TiO_2$.

To 100 parts by weight of this frit were added 8.6 parts of rutile, 16.6 parts of magnesium aluminate, 40 parts water, and about 10 parts by weight of a suspending or mill addition agent consisting of 2.9 parts by weight of boric acid, 3.0 parts potassium hydroxide, 2.0 parts potassium silicate powder, and 2 parts of sodium silicate liquid (as specified in the mill addition agent for Example 1 hereof).

The resulting mixture was applied to aluminum panels, dried and fired using the same procedure and conditions as set forth in Example 1.

For comparison purposes, an identical mixture, except that the magnesium aluminate was omitted and the rutile content increased to 20 parts by weight, was applied to an aluminum panel using the same conditions and procedure.

The resulting coating free of the magnesium aluminate additive exhibited specular gloss of about 83 units, a surface abrasion index of 39.3%, and a sub-surface abrasion index of 8.8 milligrams per minute, whereas the coating containing the magnesium aluminate showed a specular gloss of 81%, a surface abrasion index of 43%, and a sub-surface abrasion index of 6.6 milligrams per minute. Thus the improvement imparted by the addition of magnesium aluminate to lead-bearing porcelain enamels for aluminum is comparable to the improvement imparted to known lead-free porcelain enamels for aluminum when magnesium aluminate is added as taught herein.

Where high gloss and high hardness enamels are desired, it is critical that magnesium aluminate be added to previously-formed glassy frit compositions in an amount between about 5 parts by weight per 100 parts by weight of base frit material up to about 80 parts by weight per 100 parts of base frit material. Preferably, the addition of magnesium aluminate will be at least about 10 and even 15 or 20 parts by weight per 100 parts by weight of base frit material, and will range up to about 60 parts by weight per 100 parts of base frit material for best gloss results.

Upgrading of existing known porcelain enamels for aluminum base surfaces may be accomplished according to the teachings herein using any suitable base porcelain enamel frit for aluminum. For example, glassy frits for aluminum set forth in copending application of Stradley, Serial No. 672,357, filed July 17, 1957, are improved as to hardness with retention of gloss by following the teachings of this invention; and the disclosure of that copending application is here incorporated by reference. For brevity, lead-bearing porcelain enamels for aluminum as disclosed in Deyrup U.S. Patent No. 2,487,114 are also here incorporated by reference. Other enameling frits especially designed for application to aluminum base surfaces may also be employed.

Generally these enameling frits will analyze to contain at least 10 mol percent and up to about 55 mol percent of $SiO_2$, between 0 and 40 mol percent $TiO_2$, between about 35 and 65 mol percent of $SiO_2$ and $TiO_2$ in combination, from about 1 up to about 25 mol percent of RO oxides (bivalent oxides such as alkaline earth metal oxides, zinc oxide, cadmium oxide, tin oxide, lead oxide, etc). from about 15 to 45 mol percent of $R_2O$ oxides (e.g., $Li_2O$, $Na_2O$, $K_2O$), between 0 and 15 mol percent of $B_2O_3$, 0 to 5 mol percent $P_2O_5$, 0 to 5 mol percent, $Bi_2O_3$, and between 0 and 2 or 3 mol percent of $Sb_2O_3$, etc. The oxides are present in balanced compositions which exhibit the necessary maturing temperature for use on aluminum and which exhibit the thermal expansion coefficients for use on aluminum base materials.

It has been emphasized herein that the magnesium aluminate must be added to the slip composition or mixed with previously-formed glassy base frit material in order to gain high hardness and high gloss characteristics as described. The following will demonstrate this point. When 22 parts by weight of magnesium aluminate spinel were mixed with raw material oxides and the resulting mixture melted into a glassy frit, enamel coatings prepared using the frit exhibited extremely low gloss values of only about 8 units or so. Such coatings may be useful for chalkboards, where mat finishes are desired, but are generally unacceptable for use on cooking utensils and the like.

For cooking utensils as well as thread guides, high-hardness coatings exhibiting a gloss at least above about 40 units have been found to give excellent results.

An interesting feature of the invention is that the magnesium aluminate addition may be employed in combination with other, more or less conventional opacifiers and coloring agents for porcelain enamels. This sometimes gives rather unexpected results in terms of gloss and hardness. For example, using 24 parts of magnesium aluminate and 48 parts of barium titanate for every 100 parts of base frit material such as illustrated in Example 1 hereof gives a finally matured enamel coating having a specular gloss of about 54 units with improved hardness such as described. Additions of zircon up to about 50 parts by weight per 100 parts of base material with additions of magnesium aluminate as specified herein, also give coatings of improved hardness and relatively high gloss characteristics as described. Generally up to about 40 or even 50 parts by weight of various other materials, even opacifiers, may be used in combination with the magnesium aluminate to give surfaces of varied texture and significantly improved hardness as taught herein.

By the practice of the invention, it is possible to match the colors obtained using prior art porcelain enamels and techniques, although in some cases the quantity of pigment or color additive may need some slight modification to gain exact color values as obtained using enameling slips free of magnesium aluminate.

Adoption of techniques herein discussed does not result in any increased difficulty in the usual processing techniques employed for applying enamel coatings to base surfaces.

Where desired, the materials employed in the formulas for enameling slip compositions may be compounded in dry form and marketed as a new article of commerce. Illustratively, the glassy base frit may be mixed with magnesium aluminate powder and the mixture sold in commerce, with or without suspending agents in dry powdered form admixed therewith. Of course, the slip composition itself, containing the magnesium aluminate, may also be so marketed.

Surprisingly, rather large additions of magnesium aluminate are possible without upsetting the smoothness of finish of resulting enamel coatings, which is a particularly desirable feature in the manufacture of thread guides where hardness and abrasion resistance are required for wearability, but smoothness of finish is frequently desired to avoid fraying of yarns.

That which is claimed is:

1. The method of forming abrasion-resistant porcelain coatings of high hardness comprising compounding a slip composition including 100 parts by weight of glassy frit particles suitable for use in providing a porcelain enamel coating on aluminum base materials, said glassy frit particles being maturable at temperatures not in excess of 600° C. into a porcelain enamel which exhibits a coefficient of thermal expansion of at least $10 \times 10^{-6}$ per ° C. between 50 and 350° C., and between 5 and 100 parts by weight of magnesium aluminate spinel, applying said slip as a coating on a metal base member, and firing said coating to maturation at temperatures up to 600° C.

2. The method of claim 1 wherein the glassy frit particles analyze to contain the following in the mol percentage range recited: 10 to 55% $SiO_2$, 0 to 40% $TiO_2$, 35 to 65% of $SiO_2$ and $TiO_2$ in combination, 1 to 25% of bivalent oxides selected from the group consisting of barium oxide, calcium oxide, magnesium oxide, strontium oxide, zinc oxide, cadmium oxide, tin oxide and lead oxide, 15 to 45% of monovalent oxides selected from the group $Li_2O$, $Na_2O$ and $K_2O$, 0 to 15% $B_2O_3$, 0 to 5% $P_2O_5$, 0 to 5% $Bi_2O_3$, and 0 to 3% $Sb_2O_3$.

3. The method of claim 1 wherein the metal base member has an aluminum base composition.

4. As a new article of manufacture: an article having a metal base member and a high hardness porcelain enamel coating adherent to said base member, said porcelain enamel coating being formed by firing to maturation a coating comprising glassy frit particles suitable for use in providing a porcelain enamel coating on aluminum base materials, said glassy frit particles being maturable at temperatures not in excess of 600° C. into a porcelain enamel which exhibits a coefficient of thermal expansion of at least $10 \times 10^{-6}$ per ° C. between 50 and 350° C., and between 5 and 100 parts by weight of magnesium aluminate spinel for every 100 parts by weight of said glassy frit material.

5. The article of claim 4 wherein the glassy frit particles of the coating fired to maturation analyze to contain the following in the mol percentage range recited: 10 to 55% $SiO_2$, 0 to 40% $TiO_2$, 35 to 65% of $SiO_2$ and $TiO_2$ in combination, 1 to 25% of bivalent oxides selected from the group consisting of barium oxide, calcium oxide, magnesium oxide, strontium oxide, zinc oxide, cadmium oxide, tin oxide and lead oxide, 15 to 45% of monovalent oxides selected from the group $Li_2O$, $Na_2O$ and $K_2O$, 0 to 15% $B_2O_3$, 0 to 5% $P_2O_5$, 0 to 5% $Bi_2O_3$, and 0 to 3% $Sb_2O_3$.

6. The article of claim 4 wherein the metal base member has an aluminum base composition.

7. A composition suitable for use in providing metal base materials with a porcelain enamel coating, said composition comprising 100 parts by weight of glassy frit particles suitable for use in providing a porcelain enamel coating on aluminum base materials, said glassy frit particles being maturable at temperatures not in excess of 600° C. into a porcelain enamel which exhibits a coefficient of thermal expansion of at least $10 \times 10^{-6}$ per ° C. between 50 and 350° C., and between 5 and 100 parts by weight of magnesium aluminate spinel.

8. The composition of claim 7 wherein the glassy frit particles analyze to contain the following in the mol percentage range recited: 10 to 55% $SiO_2$, 0 to 40% $TiO_2$, 35 to 65% of $SiO_2$ and $TiO_2$ in combination, 1 to 25% of bivalent oxides selected from the group consisting of barium oxide, calcium oxide, magnesium oxide, strontium oxide, zinc oxide, cadmium oxide, tin oxide and lead oxide, 15 to 45% of monovalent oxides selected from the group $Li_2O$, $Na_2O$ and $K_2O$, 0 to 15% $B_2O_3$, 0 to 5% $P_2O_5$, 0 to 5% $Bi_2O_3$, and 0 to 3% $Sb_2O_3$.

9. A composition suitable for use in providing metal base materials with a porcelain enamel coating, said composition comprising 100 parts by weight of glassy frit particles suitable for use in providing a porcelain enamel coating on aluminum base materials, said glassy frit particles being maturable at temperatures not in excess of 600° C. into a porcelain enamel which exhibits a coefficient of thermal expansion of at least $10 \times 10^{-6}$ per ° C. between 50 and 350° C., between 15 and 60 parts by weight of magnesium aluminate spinel, and between 0 to 25 parts by weight of titania.

10. The composition of claim 9 wherein the glassy frit particles analyze to contain the following in the mol percentage range recited: 10 to 55% $SiO_2$, 0 to 40% $TiO_2$, 35 to 65% of $SiO_2$ and $TiO_2$ in combination, 1 to 25% of bivalent oxides selected from the group consisting of barium oxide, calcium oxide, magnesium oxide, strontium oxide, zinc oxide, cadmium oxide, tin oxide and lead oxide, 15 to 45% of monovalent oxides selected from the group $Li_2O$, $Na_2O$ and $K_2O$, 0 to 15% $B_2O_3$, 0 to 5% $P_2O_5$, 0 to 5% $Bi_2O_3$, and 0 to 3% $Sb_2O_3$.

11. A thread guide comprising a metal base member with the surface thereof over which thread is designed to pass covered with a porcelain enamel coating formed by firing to maturation a coating comprising glassy frit particles suitable for use in providing a porcelain enamel coating on aluminum base materials, said glassy frit particles being maturable at temperatures not in excess of 600° C. into a porcelain enamel which exhibits a coefficient of thermal expansion of at least $10 \times 10^{-6}$ per ° C. between 50 and 350 ° C., and between 5 and 100 parts by weight of magnesium aluminate spinel for every 100 parts by weight of said glassy frit material.

12. The thread guide of claim 11 wherein the glassy frit particles of the coating fired to maturation analyze to contain the following in the mol percentage range recited: 10 to 55% $SiO_2$, 0 to 40% $TiO_2$, 35 to 65% of $SiO_2$ and $TiO_2$ in combination, 1 to 25% of bivalent oxides selected from the group consisting of barium oxide, calcium oxide, magnesium oxide, strontium oxide, zinc oxide, cadmium oxide, tin oxide and lead oxide, 15 to 45% of monovalent oxides selected from the group $Li_2O$, $Na_2O$ and $K_2O$, 0 to 15% $B_2O_3$, 0 to 5% $P_2O_5$, 0 to 5% $Bi_2O_3$, and 0 to 3% $Sb_2O_3$.

13. The thread guide of claim 11 wherein the metal base member has an aluminum base composition.

References Cited in the file of this patent

UNITED STATES PATENTS

| | | |
|---|---|---|
| 2,311,039 | Emery | Feb. 16, 1943 |
| 2,475,469 | Bennett et al. | July 5, 1949 |
| 2,707,691 | Wheildon | May 3, 1955 |
| 2,904,449 | Bradstreet | Sept. 15, 1959 |